United States Patent
Tango et al.

(10) Patent No.: US 11,402,824 B2
(45) Date of Patent: *Aug. 2, 2022

(54) NUMERICAL CONTROLLER

(71) Applicant: FANUC CORPORATION, Yamanashi (JP)

(72) Inventors: Chikara Tango, Yamanashi (JP); Daisuke Uenishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 357 days.

This patent is subject to a terminal disclaimer.

(21) Appl. No.: 16/661,293

(22) Filed: Oct. 23, 2019

(65) Prior Publication Data

US 2020/0133236 A1 Apr. 30, 2020

(30) Foreign Application Priority Data

Oct. 31, 2018 (JP) .............................. JP2018-205919

(51) Int. Cl.
G05B 19/416 (2006.01)

(52) U.S. Cl.
CPC .. G05B 19/416 (2013.01); *G05B 2219/34465* (2013.01); *G05B 2219/35386* (2013.01); *G05B 2219/42173* (2013.01)

(58) Field of Classification Search
None
See application file for complete search history.

(56) References Cited

U.S. PATENT DOCUMENTS 9,904,272 B2 2/2018 Noda et al.
11,003,161 B2 * 5/2021 Tango .................. G05B 19/416

(Continued)

FOREIGN PATENT DOCUMENTS

JP S61-256407 A 11/1986
JP H05-143145 A 6/1993

(Continued)

OTHER PUBLICATIONS

An Office Action mailed by the Japanese Patent Office dated Dec. 8, 2020, which corresponds to Japanese Application No. 2018-205920 with English translation.

(Continued)

*Primary Examiner* — Sean Shechtman
(74) *Attorney, Agent, or Firm* — Studebaker & Brackett PC

(57) ABSTRACT

To provide a numerical controller that can detect the position at which the look-ahead blocks used to determine an acceleration/deceleration operation is insufficient in a machining program in order to stabilize feed rate, cutting speed and other factors. A numerical controller includes a program execution unit that executes a machining program, a program look-ahead unit that looks ahead at the machining program in parallel with execution of the machining program, a theoretical value calculation unit that calculates theoretical values per block in processing time for the machining program from the feed rate of the machine tool and lengths of minute straight lines that make up the machining path followed by the machine tool, a measured value calculation unit that calculates actually measured values per block in the look-ahead time taken by the program look-ahead unit and the processing time for the machining program while the machining program is being executed, and an abnormal block detection unit that detects an abnormal block that is a block at which the result of subtracting the total of the theoretical values from the total of the actually measured values is more than a prescribed value.

6 Claims, 9 Drawing Sheets

(56) References Cited

U.S. PATENT DOCUMENTS

| | | | |
|---|---|---|---|
| 2006/0229761 A1* | 10/2006 | Kita | G05B 19/4068 700/181 |
| 2008/0294877 A1* | 11/2008 | Haga | G05B 19/4155 712/216 |
| 2012/0010745 A1 | 1/2012 | Ide et al. | |
| 2016/0363927 A1 | 12/2016 | Koshida | |

FOREIGN PATENT DOCUMENTS

| | | |
|---|---|---|
| JP | H10-254517 A | 9/1998 |
| JP | 2001-034320 A | 2/2001 |
| JP | 3723015 B2 | 12/2005 |
| JP | 2006-294053 A | 10/2006 |
| JP | 2007-094936 A | 4/2007 |
| JP | 2007-164509 A | 6/2007 |

OTHER PUBLICATIONS

Office Action issued by the U.S Patent and Trademark Office dated Nov. 25, 2020, which corresponds to U.S. Appl. No. 16/663,146.

\* cited by examiner

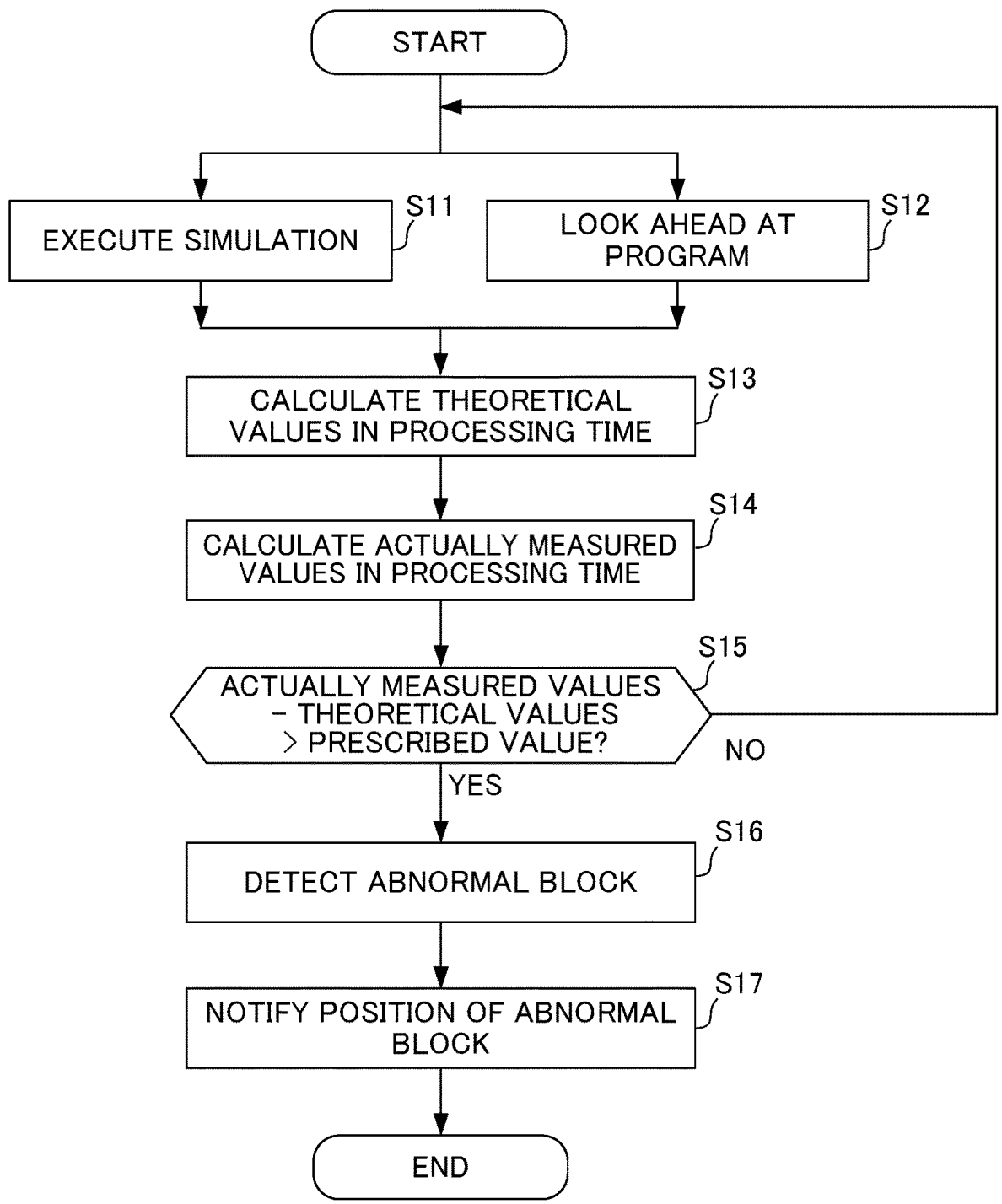

NUMERICAL CONTROLLER

This application is based on and claims the benefit of priority from Japanese Patent Application No. 2018-205919, filed on 31 Oct. 2018, the content of which is incorporated herein by reference.

BACKGROUND OF THE INVENTION

Field of the Invention

The present invention relates to a numerical controller.

Related Art

In the manufacturing industry today, IT parts and other devices are being manufactured on smaller scales and with higher precision, and interest in high-speed and high-precision machining is on the rise. In order to achieve even higher quality in machining, there has been an increase in the number of workpiece machining programs for high-speed and high-precision machining that are created with tolerances on smaller orders.

Conventionally, machining programs with small tolerances could not realistically be used due to low computer processing power. However, in recent years, both computer performance and computer aided manufacturing (CAM) performance have improved to the point where machining programs with small tolerances can now be easily created. This trend is expected to grow in years to come.

One aspect other than tolerance that is important when producing high-quality machining is uniformizing minute straight lines. Machining quality is increased when vibration is reduced through stabilizing acceleration/deceleration at each axle. As a result, there has been an increase in the number of high-quality machining programs featuring even minute straight lines. Therefore, machining programs are now made up of more blocks.

In the prior art, a numerical controller looks ahead at programs and reads out and processes a program for blocks to be executed next according to the first in, first out (FIFO) method from a number of programs stored in advance equal to look-ahead blocks. Then, the numerical controller determines an acceleration/deceleration operation and performs axis control.

However, such high-quality machining programs have the following problem. That is, the programs have short minute straight lines and fast command speed which means that, if the processing time for executing the program is shorter than the time required for look-ahead processing, the look-ahead blocks used to determine the acceleration/deceleration operation cannot be secured. As a result, acceleration/deceleration is not determined in consideration of program behavior and changes in speed are not constant and high-quality machining cannot be achieved.

FIG. 9 is a graph showing the difference in acceleration/deceleration over time when change in speed is unstable. As illustrated in FIG. 9, speed initially moves stably at a command speed of 6,000 mm/min. At 2,000 mm/min, there was insufficient processing time for executing the program and the look-ahead blocks used to determine the acceleration/deceleration operation could not be secured. Therefore, speed became unstable and moved slightly as indicated by the arrows in FIG. 9. Such behavior is particularly prominent when a machine tool has a large number of axes, such as in 5-axis machining, and when the numerical controller has limited processing power. These problems can be solved by increasing the processing power of the numerical controller used for looking ahead or executing machining programs. However, similar problems occur when command speed is further increased by making programs more detailed or updating machines.

In order to provide a solution to these problems, the invention described in Patent Document 1 discloses a technology in which a numerical controller monitors the amount of data in a buffer that is held by the FIFO method until analysis data consisting of analyzed NC data is used as acceleration/deceleration interpolation means. In particular, the technology determines that there is insufficient data when the amount of data predicted to exist in the buffer falls below a lower limit threshold value.

Patent Document 1: Japanese Patent No. 3723015

SUMMARY OF THE INVENTION

However, the technology disclosed in Patent Document 1 only increases the priority of the NC data analysis processing task when it is determined that there is insufficient data, and does not determine what data in the NC data is insufficient or at which position there is insufficient data.

It is an object of the present invention to provide a numerical controller that can detect the position at which a speed control abnormality is likely to occur due to an insufficient number of look-ahead blocks that are used to determine an acceleration/deceleration operation in a machining program in order to stabilize feed rate, cutting speed and other factors.

(1) A numerical controller according to the present invention is a numerical controller (for example, a "numerical controller 100" to be described later) for controlling a machine tool that has axes by executing a machining program that is made up of a plurality of blocks and that controls acceleration/deceleration of the axes, the numerical controller including: a program execution unit (for example, a "program execution unit 111" to be described later) that executes the machining program, a program look-ahead unit (for example, a "program look-ahead unit 112" to be described later) that looks ahead at the machining program in parallel with execution of the machining program, a theoretical value calculation unit (for example, a "theoretical value calculation unit 113" to be described later) that calculates theoretical values per block in processing time for the machining program from the feed rate of the machine tool and lengths of minute straight lines that make up the machining path followed by the machine tool, a measured value calculation unit (for example, a "measured value calculation unit 114" to be described later) that calculates actually measured values per block in the look-ahead time taken by the program look-ahead unit and the processing time for the machining program, and an abnormal block detection unit (for example, an "abnormal block detection unit 115" to be described later) that detects an abnormal block that is a block at which the result of subtracting the total of the theoretical values from the total of the actually measured values is more than a prescribed value.

(2) The numerical controller described in Item (1) may further include an abnormal block notification unit (for example, an "abnormal block notification unit 116" to be described later) that notifies outside the numerical controller of a position of the abnormal block in the machining program.

(3) The numerical controller described in Item (1) or (2) may further include a recommended value calculation unit (for example, a "recommended value calculation unit 117"

to be described later) that, when the abnormal block is detected, calculates a command speed as a recommended value for securing the look-ahead blocks from the lengths of the minute straight lines, the look-ahead time, and the processing time for each block.

(4) The numerical controller described in Item (3) may further include a recommended value notification unit (for example, a "recommended value notification unit 118" to be described later) that notifies outside the numerical controller of the recommended value.

(5) The numerical controller described in Item (3) or (4) may further include a command speed update unit (for example, a "command speed update unit 119" to be described later) that uses the recommended value calculated by the recommended value calculation unit to update a command speed that is set in the machining program after the abnormal block.

(6) In the numerical controller described in any one of Items (1) to (5), the program execution unit may stop the machining program when the abnormal block is detected.

According to the present invention, it is possible to detect the position at which a speed control abnormality is likely to occur due to an insufficient number of look-ahead blocks that are used to determine an acceleration/deceleration operation in a machining program in order to stabilize feed rate, cutting speed and other factors.

BRIEF DESCRIPTION OF THE DRAWINGS

FIG. 6 is a flowchart for illustrating first operation of the numerical controller according to an embodiment of the present invention.

DETAILED DESCRIPTION OF THE INVENTION

Now, an embodiment of the present invention is described with reference to FIGS. 1 to 8.

1. CONFIGURATION OF INVENTION

Figure 1:
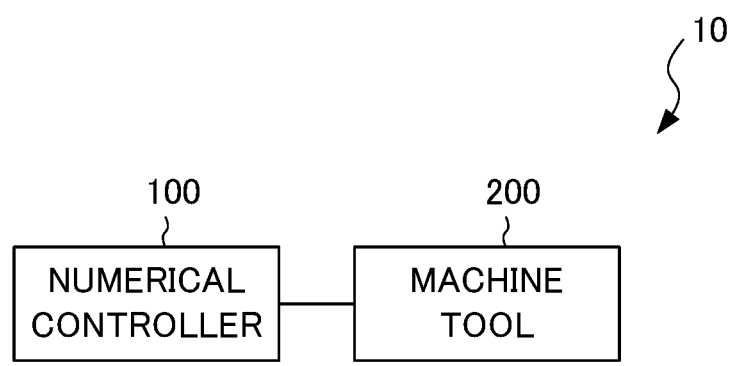
FIG. 1 is a diagram for illustrating the configuration of a control system including a numerical controller according to an embodiment of the present invention.

FIG. 1 illustrates the configuration of a control system 10 that includes a numerical controller 100 according to the present invention and a machine tool 200 that is controlled by the numerical controller 100.

The numerical controller 100 is a machine that outputs an operation command to the machine tool 200 to numerically control the machine tool 200 using functions to be described later. A detailed description of the configuration and functions of the numerical controller 100 is provided later.

The machine tool 200 is a device that performs predetermined machining such as cutting. The machine tool 200 includes a motor that is driven to machine workpiece and a spindle and a feed axis that are attached to the motor. The machine tool 200 also includes fixtures and tools that correspond to the respective axes. The motor of the machine tool 200 is driven on the basis of an operation command that is output from the numerical controller 100 such that the machine tool 200 performs predetermined machining. Herein, the contents of the predetermined machining are not particularly limited and types of machining other than cutting, such as grinding, polishing, rolling or forging, may also be employed.

Figure 2:
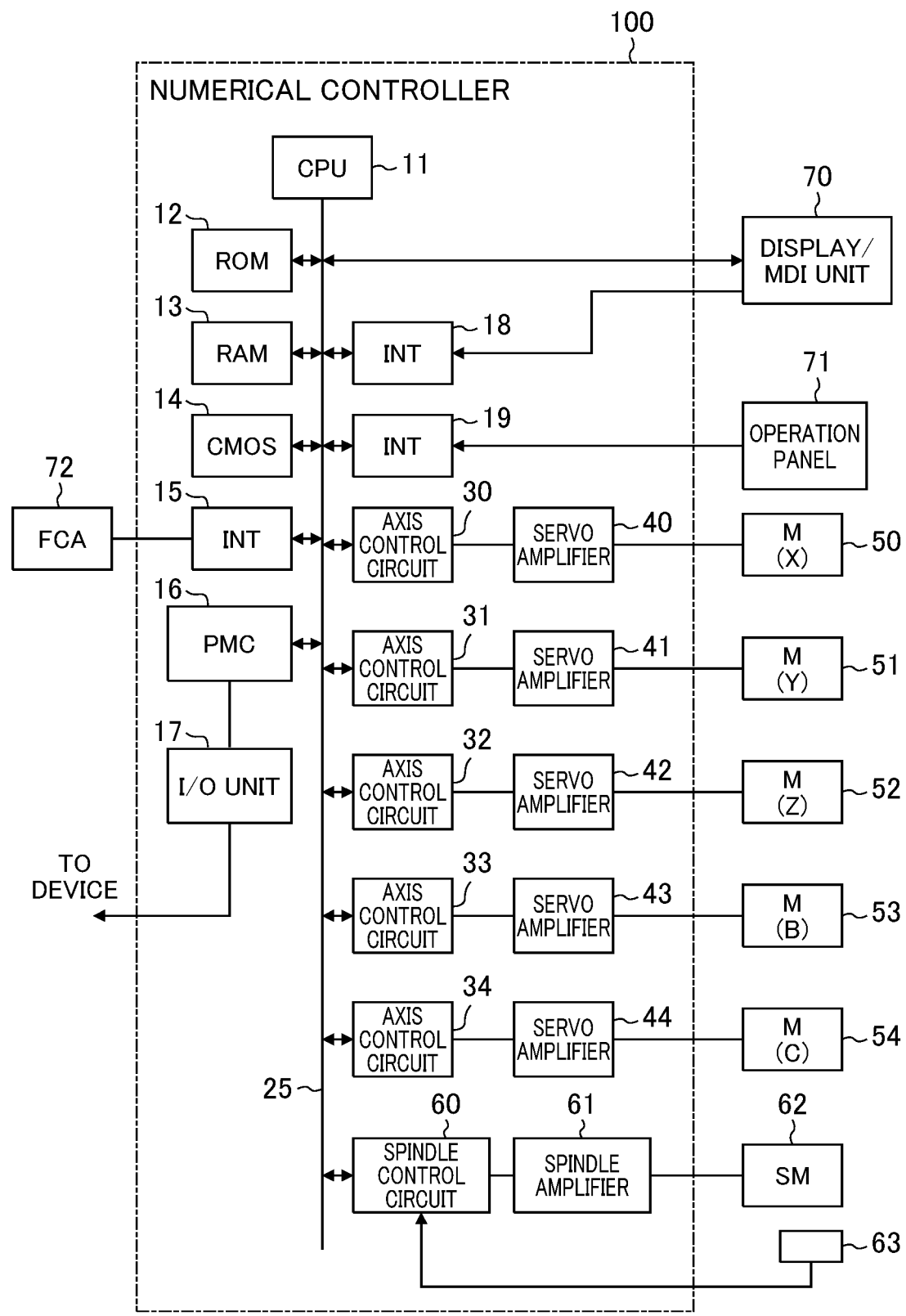
FIG. 2 is a diagram for illustrating the configuration of the numerical controller according to the embodiment of the present invention.

FIG. 2 is a diagram for illustrating an exemplary configuration of the numerical controller 100 according to the embodiment of the present invention. The numerical controller 100 primarily includes a CPU 11, a ROM 12, a RAM 13, a CMOS 14, interfaces 15, 18 and 19, a programmable machine controller (PMC) 16, an I/O unit 17, axis control circuits 30 to 34, servo amplifiers 40 to 44, a spindle control circuit 60, and a spindle amplifier 61.

The CPU 11 is a processor that controls the entire numerical controller 100. The CPU 11 reads out a system program that is stored in the ROM 12 via a bus 25 and controls the entire numerical controller 100 according to the system program.

The RAM 13 stores temporary calculation data and display data and various types of data that is input by an operator using a display/MDI unit 70.

The CMOS memory 14 is a non-volatile memory that is backed up by a battery (not shown) and that retains its storage state even when power to the numerical controller 100 is turned off. The CMOS memory 14 stores a machining program that was read to the CMOS memory 14 via the interface 15, a machining program that was input to the CMOS memory 14 via the display/MDI unit 70, and other data.

The ROM 12 is pre-written with various types of system programs for executing processing for an edit mode required to create and edit machining programs and processing for automatic operation.

Various types of machining programs such as the machining programs for implementing the present invention can be input using the interface 15 or the display/MDI unit 70 and stored in the CMOS memory 14.

The interface 15 can connect the numerical controller 100 to an external device 72 such as an adaptor. Machining programs, various parameters and other data are read from the external device 72 side. Machining programs that are edited within the numerical controller 100 can be stored in external storage means using the external device 72.

The programmable machine controller (PMC) 16 outputs signals via the I/O unit 17 to an auxiliary device (for example, an actuator in the form of a robot hand used for replacing tools) for a machine tool using a sequence program stored in the numerical controller 100 and controls the device. The PMC 16 receives signals such as those for various switches on an operation panel provided in the body of the machine tool, and transmits those signals to the CPU 11 after executing required signal processing.

The display/MDI unit 70 is a manual data input device that includes components such as a display and a keyboard. The interface 18 receives commands and data from a keyboard in the display/MDI unit 70 and transfers those commands and data to the CPU 11. The interface 19 is connected to an operation panel 71. The operation panel 71 includes a manual pulse generator.

The axis control circuits 30 to 34 for each axis receive movement command amounts for each axis from the CPU 11 and output the commands for each axis to the servo amplifiers 40 to 44.

The servo amplifiers 40 to 44 receive these commands and drive servo motors 50 to 54 for each axis. Each servo motor 50 to 54 for each axis includes a position/speed detector. The position/speed detectors output position/speed feedback signals that are fed back to each axis control circuit 30 to 34 to perform feedback control for position/speed. Note that this position/speed feedback is omitted from the block diagrams.

The spindle control circuit 60 receives a spindle rotation command for the machine tool and outputs a spindle speed signal to the spindle amplifier 61. The spindle amplifier 61 receives the spindle speed signal and rotates the spindle motor 62 of the machine tool at the commanded rotational speed to drive the tool.

The spindle motor 62 is connected to a pulse encoder 63 by a gear, a belt, or another component. The pulse encoder 63 outputs a feedback pulse in synchronization with rotation of the spindle. The feedback pulse is read by the CPU 11 via the bus 25.

In the exemplary configuration of the numerical controller 100 illustrated in FIG. 2, five axis control circuits (axis control circuits 30 to 34) and five servo motors (servo motors 50 to 54) are illustrated. However, the present invention is not limited to this configuration and any number of axis control circuits and servo motors may be provided.

Figure 3:
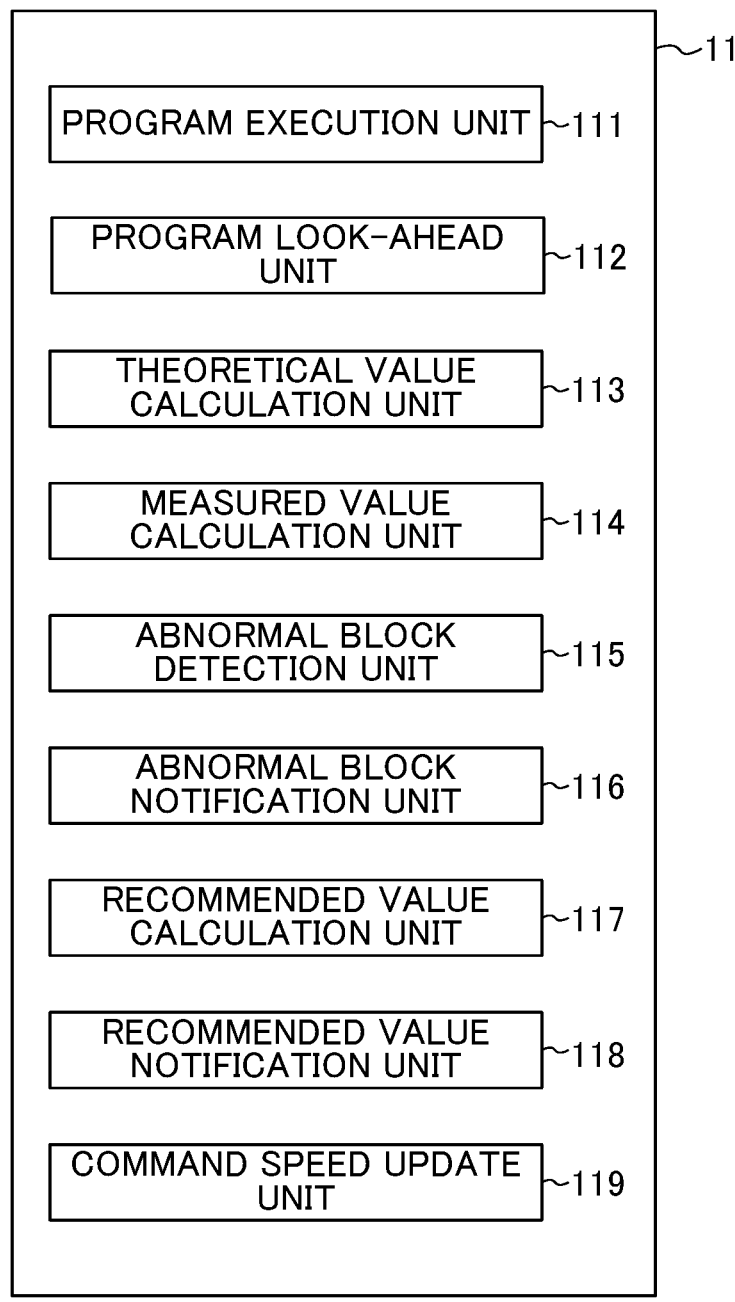
FIG. 3 is a diagram for illustrating function blocks for the numerical controller according to the embodiment of the present invention.

FIG. 3 is a function block diagram for illustrating a function where the CPU 11 reads out system programs and application programs stored in the ROM 12 via the bus 25 and implements the present invention according to those system programs and application programs. The CPU 11 includes a program execution unit 111, a program look-ahead unit 112, a theoretical value calculation unit 113, a measured value calculation unit 114, an abnormal block detection unit 115, an abnormal block notification unit 116, a recommended value calculation unit 117, a recommended value notification unit 118 and a command speed update unit 119.

The program execution unit 111 executes a machining program. More specifically, in this embodiment, the program execution unit 111 executes a simulation of the machining program. During this simulation, it is preferable, for example, that workpiece be placed on the machine tool 200 and the machine tool 200 be actually operated, instead of just executing the machining program idly. This is because the difference in look-ahead blocks over time (to be described later) changes depending on the operating environment and the axis configuration of the machine tool 200.

In parallel with the simulation of the machining program executed by the program execution unit 111, the program look-ahead unit 112 looks ahead at the machining program before the simulation is executed.

Figure 4:
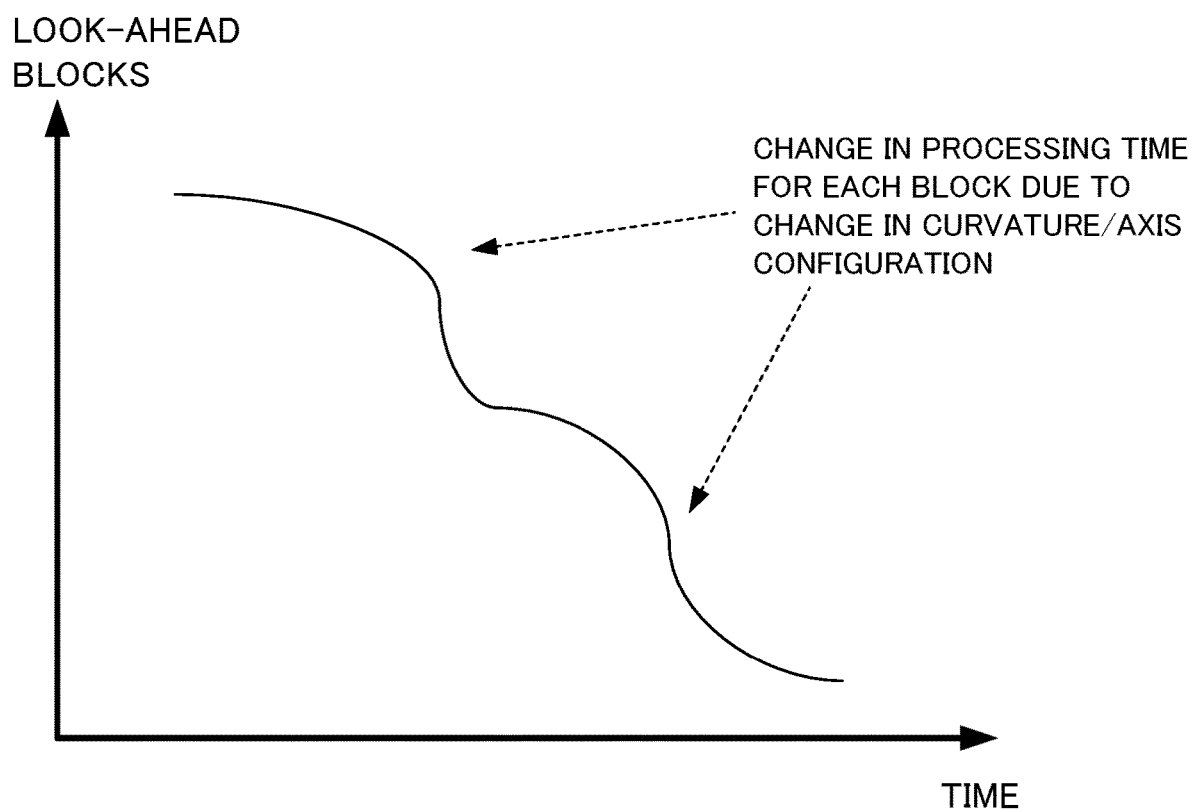
FIG. 4 is a graph for showing difference in the look-ahead blocks over time.

FIG. 4 is a graph showing a normal difference over time in the look-ahead blocks that are looked ahead by the program look-ahead unit 112. The look-ahead blocks is zero when the position of a block to be looked ahead by the program look-ahead unit 112 or the position of a block to be executed by the program execution unit 111 reaches the end of the machining program. However, the look-ahead blocks usually does not evenly decrease to zero. The rate of reduction of look-ahead blocks changes depending on the processing time for each block, which differs due to a change in the curvature of the machining path or the axis configuration.

In particular, if the speed at which the program execution unit 111 executes the machining program becomes faster and the processing time for each block becomes shorter, the rate of reduction of look-ahead blocks will increase. When this happens, the look-ahead blocks that are used to determine the acceleration/deceleration operation cannot be secured and a speed control abnormality occurs in which change in speed is no longer constant.

In the present invention, the theoretical value calculation unit 113 (to be described later) calculates theoretical values per block in the processing time for the machining program and the measured value calculation unit 114 calculates actually measured values per block in the look-ahead time taken by the program look-ahead unit 112 and the processing time for the machining program. Then, the abnormal block detection unit 115 compares the theoretical values and the actually measured values to detect an abnormal block that is a block at which a speed control abnormality is relatively likely to occur.

The theoretical value calculation unit 113 calculates theoretical values per block in the processing time for the machining program from the feed rate of the machine tool 200 and the lengths of minute straight lines that make up the machining path followed by the machine tool 200.

More specifically, the theoretical value calculation unit 113 calculates the theoretical values for the program execution processing time according to the following Equation (1):

$$\text{Theoretical values for program execution processing time (msec)} = 60 \times \text{lengths of minute straight lines (mm)} / \text{command speed (mm/min)} \quad (1)$$

The measured value calculation unit 114 calculates actually measured values per block in the total time of the look-ahead time taken by the program look-ahead unit 112 and the processing time for the machining program while the program execution unit 111 executes the machining program.

The abnormal block detection unit 115 compares the total of theoretical values per block in the processing time for the machining program calculated by the theoretical value calculation unit 113 and the total of the actually measured values per block in the look-ahead time taken by the program look-ahead unit 112 and the actual processing time for the machining program executed by the program execution unit 111, which is calculated by the measured value calculation unit 114 and detects the abnormal blocks. A block at which the result of subtracting the total of the theoretical values from the total of the measured values is more than a prescribed value is detected as an abnormal block. This abnormal block is a block at which a speed control abnormality is relatively likely to occur compared to other blocks.

The abnormal block notification unit 116 notifies outside the numerical control device 100 of the position of the abnormal block in the machining program. The abnormal block notification unit 116 may display the position of the abnormal block using, for example, the display/MDI unit 70 illustrated in FIG. 2.

When an abnormal block is detected by the abnormal block detection unit 115, the recommended value calculation unit 117 calculates a command speed as a recommended value from the lengths of minute straight lines that make up the machining path followed by the machine tool 200, the look-ahead time taken by the program look-ahead unit 112 and the processing time for each block that is executed by the program execution unit 111. More specifically, the command speed that serves as the recommended value is calculated according to the following Equation 2:

Command speed as recommended value (mm/min)=60×length of minute straight lines (mm)/(look-ahead time+execution time for each block (msec)) (2)

When an abnormal block is detected by the abnormal block detection unit 115, that is, when the result of subtracting the total of the theoretical values per block in the processing time for the machining program from the total of the measured values per block in the total time of the look-ahead time for the machining program and the actual processing time for the machining program is more than a prescribed value, the command speed set in the machining program is set to the recommended value to lower the machining speed and secure a specified number of look-ahead blocks. With this configuration, machining speed can be stabilized.

The recommended value notification unit 118 notifies outside the numerical controller 100 of the command speed as the recommended value that was calculated by the recommended value calculation unit 117. The recommended value notification unit 118 may display the recommended value using, for example, the display/MDI unit 70 illustrated in FIG. 2. With this configuration, the user of the numerical controller 100 is aware of the command speed as the recommended value and can therefore set the recommended command speed in the machining program.

The command speed update unit 119 uses the command speed serving as the recommended value that was calculated by the recommended value calculation unit 117 to update the command speed that is set in the machining program after the exhaustion block.

Figure 5A:
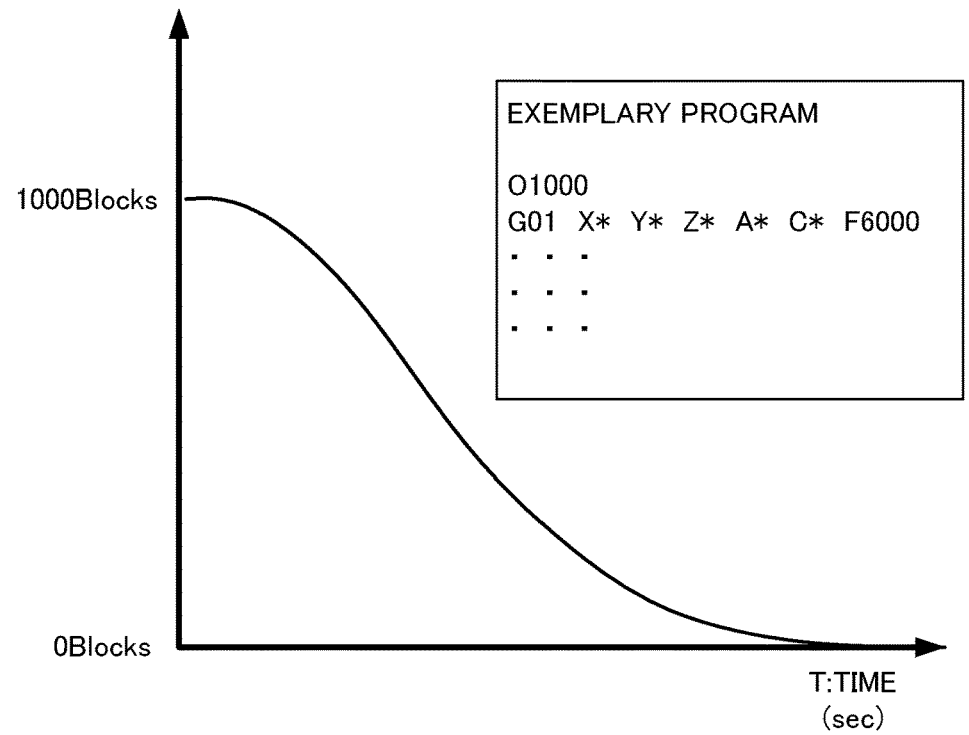
FIG. 5A is a graph for showing difference in the look-ahead blocks over time as a result of command speed being updated.
Figure 5B:
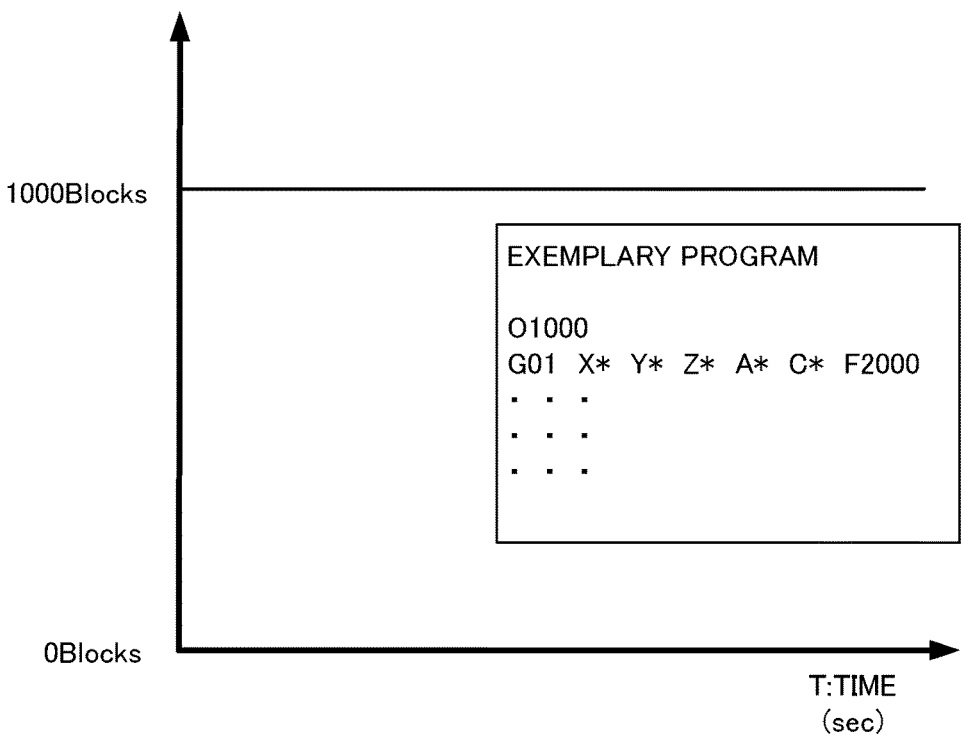
FIG. 5B is a graph for showing difference in the look-ahead blocks over time as a result of command speed being updated.

FIGS. 5A and 5B illustrate the difference in number of look-ahead blocks over time when the command speed update unit 119 has not updated the command speed that is set after the exhaustion block and when the command speed update unit 119 has updated the command speed that is set after the exhaustion block, respectively.

As illustrated in FIG. 5A, if the command speed is not updated and, for example, the command speed is F6000, the look-ahead blocks steadily decreases from 1,000 blocks and eventually becomes zero.

On the other hand, as illustrated in FIG. 5B, when the command speed is updated to F2000, the look-ahead blocks is maintained at 1,000 blocks.

2. OPERATION OF INVENTION

Now, the operation of the numerical controller 100 according to the present invention is described with reference to FIGS. 6 to 8.

2.1 First Operation

FIG. 6 is a flowchart for illustrating a first operation of the numerical controller 100 according to the present invention. In Step S11, the program execution unit 111 executes a simulation of the machining program.

In Step S12, in parallel with the machining program simulation executed by the program execution unit 111, the program look-ahead unit 112 looks ahead at the machining program before executing the simulation.

In Step S13, the theoretical value calculation unit 113 calculates theoretical values per block in the processing time for the machining program from the feed rate of the machine tool 200 and the lengths of minute straight lines that make up the machining path followed by the machine tool 200.

In Step S14, the measured value calculation unit 114 calculates actually measured values per block in the total time of the look-ahead time taken by the program look-ahead unit 112 and the processing time for the machining program while the program execution unit 111 executes the machining program simulation.

In Step S15, if the result of subtracting the total of the theoretical values per block from the total of the actually measured values per block is higher than a prescribed value (S15: YES), the processing moves to Step S16. If the result is equal to or less than the prescribed value (S15: NO), the processing moves to Steps S11 and S12.

In Step S16, the abnormal block detection unit 115 detects an abnormal block.

In Step S17, the abnormal block notification unit 116 notifies outside the numerical control device 100 of the position of the abnormal block in the machining program.

2.2 Second Operation

Figure 7:
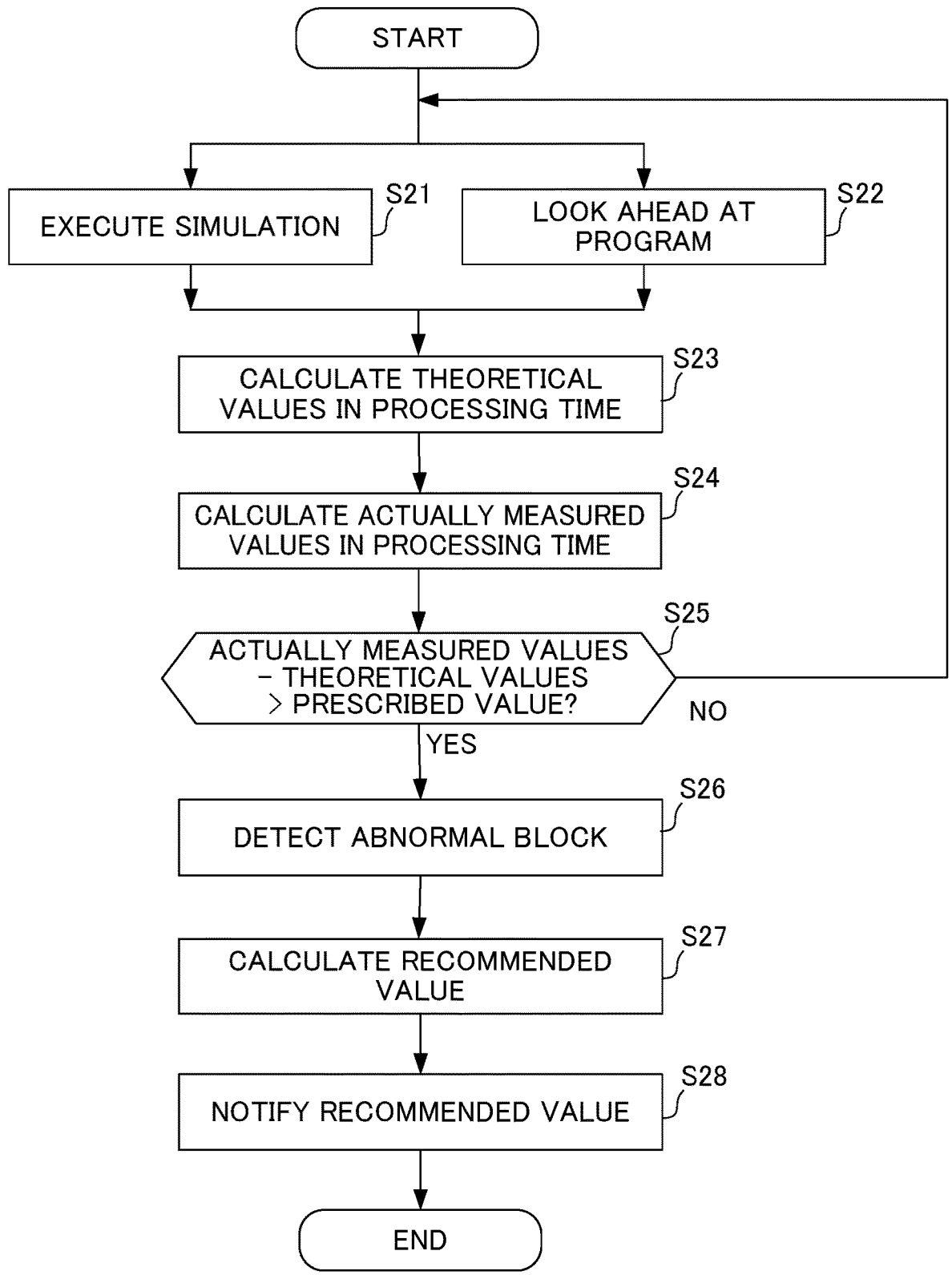
FIG. 7 is a flowchart for illustrating second operation of the numerical controller according to an embodiment of the present invention.

FIG. 7 is a flowchart for illustrating a second operation of the numerical controller 100 according to the present invention. Note that Steps S21 to S26 in FIG. 7 are identical to Steps S11 to S16 in FIG. 6 and therefore a description of these steps is omitted.

In Step S27, the recommended value calculation unit 117 calculates the command speed as the recommended value. In Step S28, the recommended value notification unit 118 notifies outside the numerical controller 100 of the command speed that serves as the recommended value.

2.3 Third Operation

Figure 8:
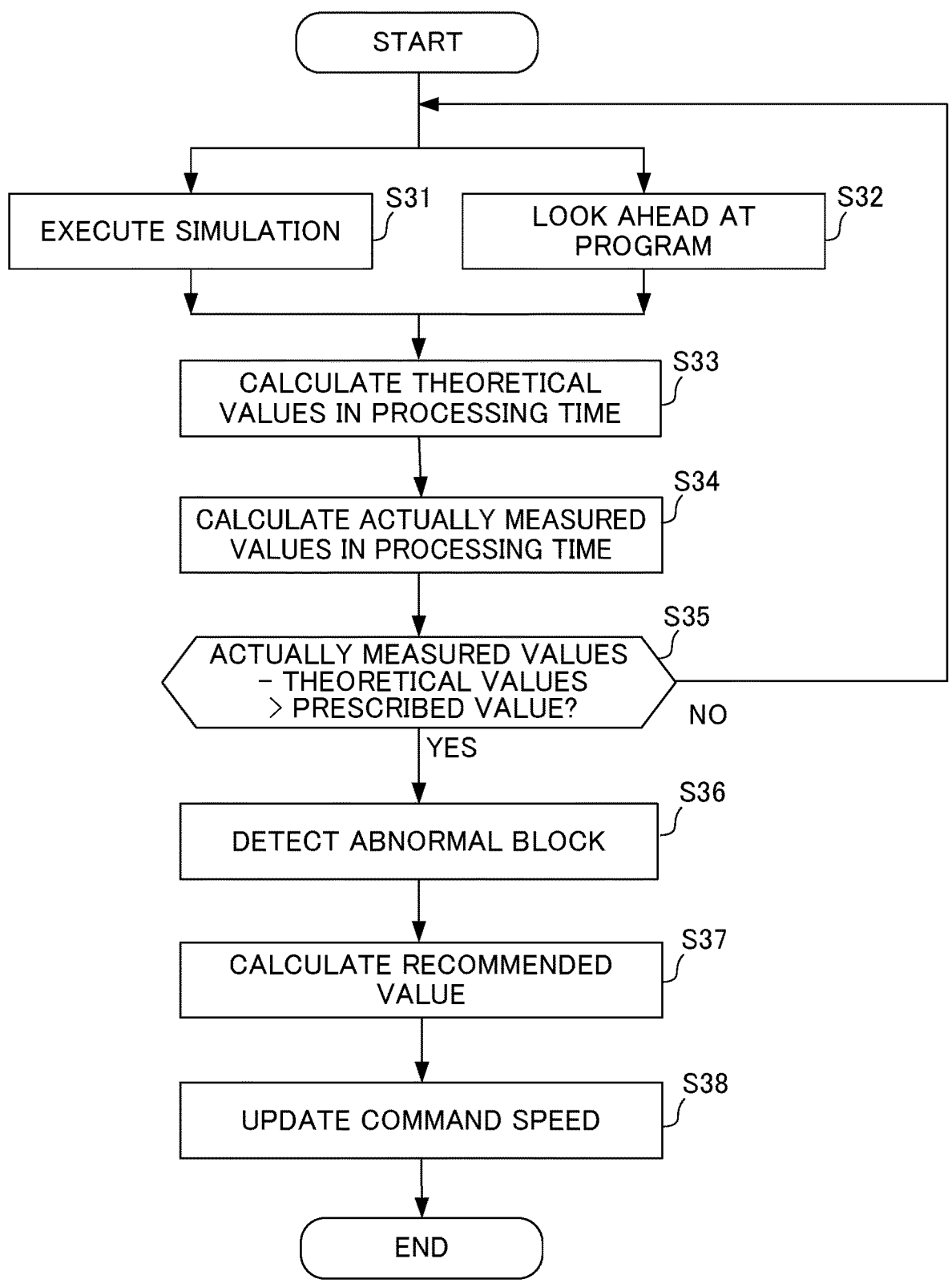
FIG. 8 is a flowchart for illustrating third operation of the numerical controller according to an embodiment of the present invention.
Figure 9:
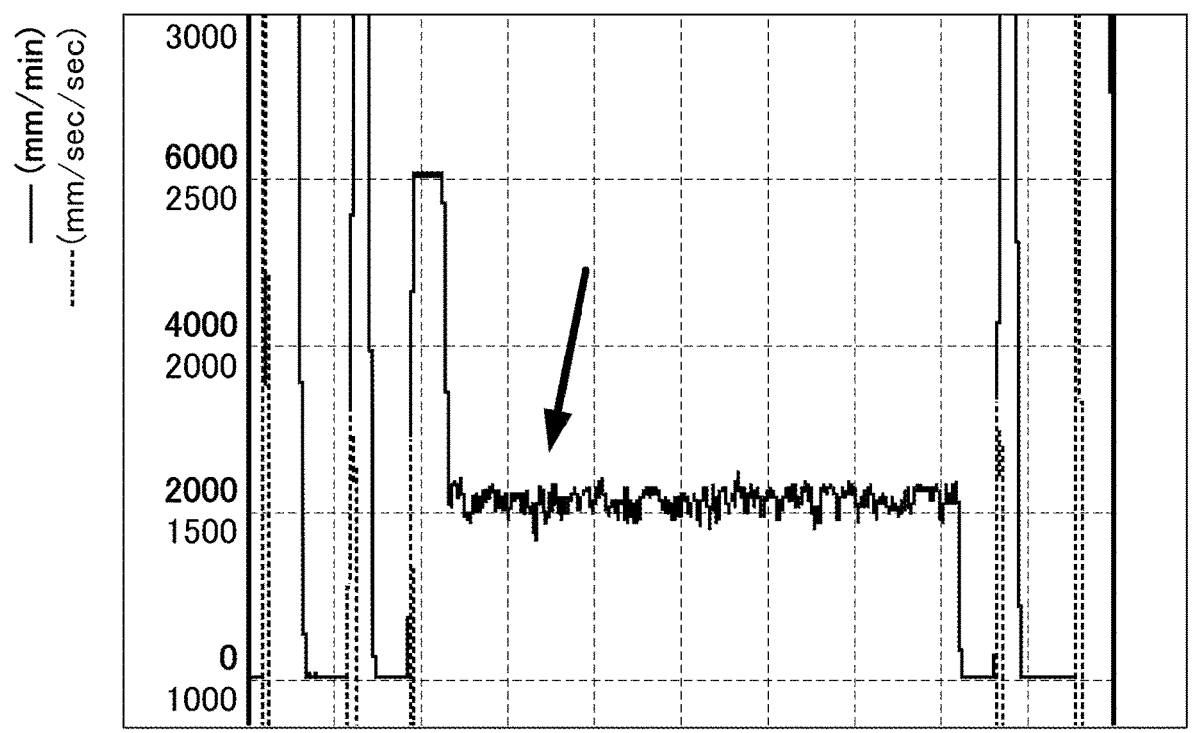
FIG. 9 is a graph for showing instability of speed due to inability to secure the look-ahead blocks.

FIG. 8 is a flowchart for illustrating a third operation of the numerical controller 100 according to the present invention. Note that Steps S31 to S37 in FIG. 8 are identical to Steps S21 to S27 in FIG. 7 and therefore a description these steps is omitted.

In Step S38, the command speed update unit 119 uses the command speed that serves as the recommended value to update the command speed that is set after the abnormal block in the machining program.

3. EFFECTS OF THE EMBODIMENT

The numerical controller 100 according to this embodiment calculates theoretical values per block in the processing time for the machining program from the feed rate of the machine tool 200 and the lengths of minute straight lines that make up the machining path followed by the machine tool 200, calculates actually measured values per block in the look-ahead time and the processing time for the machining program while the machining program is being executed, and detects an abnormal block that is a block at which the result of subtracting the total of the theoretical values from the total of the actually measured values is more than a prescribed value.

With this configuration, it is possible to detect the position in the machining program at which a speed control abnormality is likely to occur as a result of an insufficient number of look-ahead blocks used for determining the acceleration/deceleration operation in order to stabilize feed rate and cutting speed.

The numerical controller 100 according to this embodiment also notifies outside the numerical controller 100 of the position of the abnormal block in the machining program.

As a result, the user of the numerical controller 100 can be aware of the position at which a speed control abnormality is likely to occur.

Further, the numerical controller 100 according to this embodiment calculates a command speed as a recommended value for securing the look-ahead blocks.

With this configuration, machining speed of the machine tool 200 can be stabilized by the numerical controller 100.

The numerical controller 100 according to this embodiment also notifies outside the numerical controller 100 of the command speed as the recommended value for securing the look-ahead blocks.

As a result, the user of the numerical controller 100 can be aware of and set the command speed as the recommended value for securing the look-ahead blocks.

Further, the numerical controller 100 according to this embodiment uses the command speed serving as the recommended value for securing the look-ahead blocks to update the command speed that is set after the abnormal block in the machining program.

With this configuration, the user of the numerical controller 10 can automatically, rather than manually, set the command speed as the recommended value for securing the look-ahead blocks.

4. MODIFICATION EXAMPLES

4.1 Modification Example 1

In the above-described embodiment, when an abnormal block is detected, a notification of the position of that abnormal block is output and the command speed as the recommended value is calculated, but the present invention is not limited to this configuration. For example, the program execution unit 111 may stop the simulation of the machining program when an abnormal block is detected.

4.2 Modification Example 2

In the above-described embodiment, the abnormal block detection unit 115 defines an abnormal block as a block at which, after comparing the total of theoretical values per block in the processing time for the machining program calculated by the theoretical value calculation unit 113 and the total of the actually measured values per block in the look-ahead time taken by the program look-ahead unit 112 and the actual processing time for the machining program executed by the program execution unit 111, which is calculated by the measured value calculation unit 114, the result of subtracting the total of the theoretical values from the total of the actually measured values is more than a prescribed value. However, the present invention is not limited to this configuration. For example, the abnormal block detection unit 115 may define an abnormal block as a block at which the ratio of the total number of actually measured values to the total number of theoretical values exceeds a prescribed value.

4.3 Modification Example 3

In the above-described embodiment, the first to third operations are performed when the program execution unit 111 executes the machining program simulation, but the present invention is not limited to this configuration. For example, similar operations may be performed during actual machining in which the numerical controller 100 controls the machine tool 200.

4.4 Modification Example 4

In the above-described embodiment, the abnormal block detection unit 116 notifies outside the numerical controller 100 of the position of the abnormal block in the machining program, but the present invention is not limited to this configuration. For example, the number of seconds that have elapsed since the start of the machining program, which corresponds to the abnormal block, may be notified to a device external of the numerical controller 100.

An embodiment of the present invention has been described above, but the present invention is not limited to the above-described embodiment. Any described effects are merely the best effects achieved by the present invention and the effects achieved by the present invention are not limited to the description provided herein.

The control method used by the numerical controller 100 is implemented by software. When using software, the programs that constitute said software are installed on a computer (numerical controller 100). These programs may be recorded on a removable medium and distributed to a user or may be made available as a file to be downloaded to a user's computer via a network. These programs may also be provided to a user's computer (numerical controller 100) as an Internet service via a network, instead of being downloaded.

EXPLANATION OF REFERENCE NUMERALS

10 control system
100 numerical controller
111 program execution unit
112 program look-ahead unit
113 theoretical value calculation unit
114 measured value calculation unit
115 abnormal block detection unit
116 abnormal block notification unit
117 recommended value calculation unit
118 recommended value notification unit
119 command speed notification unit
200 machine tool

What is claimed is:

1. A numerical controller for controlling a machine tool that has axes by executing a machining program that is made up of a plurality of blocks and that controls acceleration/deceleration of the axes, the numerical controller comprising a processor, the processor being configured to:
   execute the machining program;
   look ahead at the machining program in parallel with execution of the machining program;
   calculate theoretical values per block in processing time for the machining program from the feed rate of the machine tool and lengths of minute straight lines that make up the machining path followed by the machine tool;
   calculate actually measured values per block in the look-ahead time taken to look ahead at the machining program in parallel with execution of the machining program and the processing time for the machining program;

detect an abnormal block that is a block at which the result of subtracting the total of the theoretical values from the total of the actually measured values is more than a prescribed value; and lower a machining speed of the machine tool in response to the abnormal block being detected.

2. The numerical controller according to claim 1, the processor being further configured to notify outside the numerical controller of a position of the abnormal block in the machining program.

3. The numerical controller according to claim 1, when the abnormal block is detected, the processor being further configured to calculate a command speed as a recommended value for securing the look-ahead blocks from the lengths of the minute straight lines, the look-ahead time, and the processing time for each block.

4. The numerical controller according to claim 3, the processor being further configured to notify outside the numerical controller of the recommended value.

5. The numerical controller according to claim 3, the processor being further configured to use the calculated recommended value to update a command speed that is set in the machining program after the abnormal block.

6. The numerical controller according to claim 1, wherein the processor is configured to lower the machining speed to stop the machine tool in response to the abnormal block being detected.

* * * * *